Oct. 13, 1925.
F. L. ROCK ET AL
AUTOMOBILE SIGNAL
Filed June 23, 1924
1,557,335
2 Sheets-Sheet 1
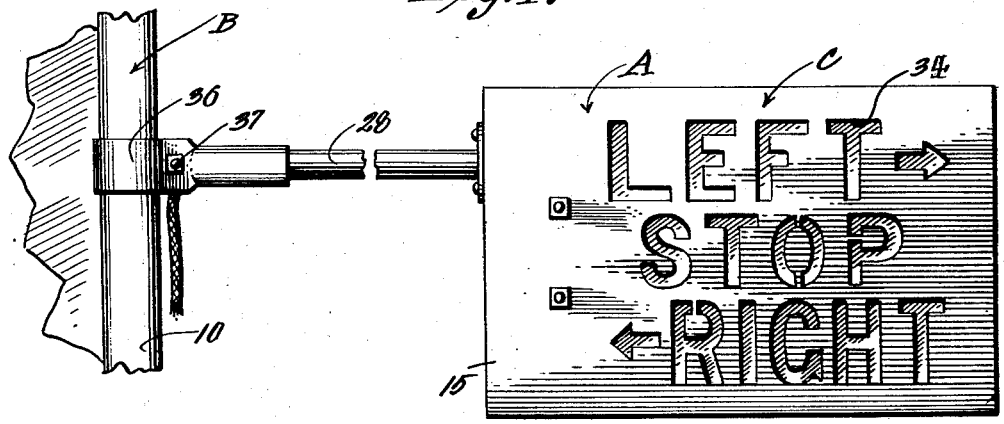
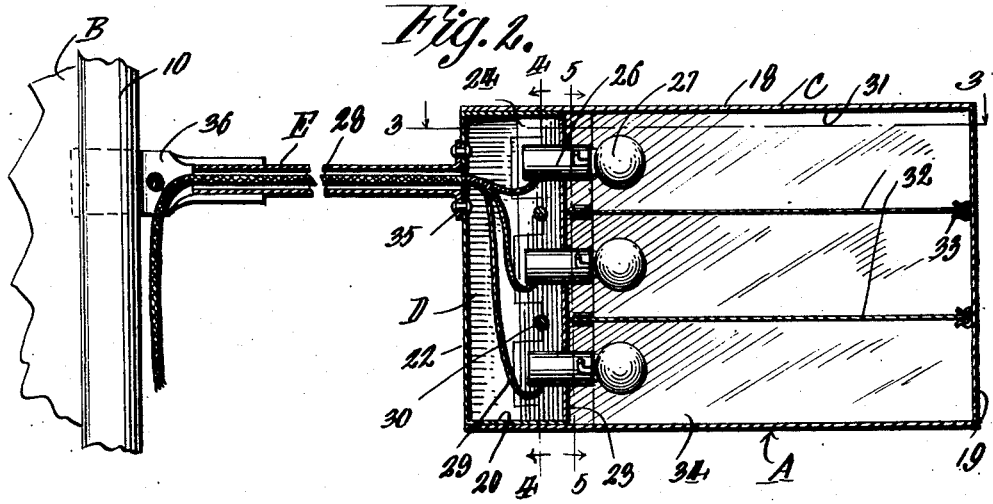

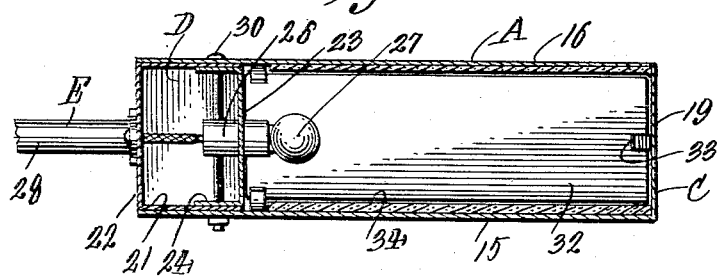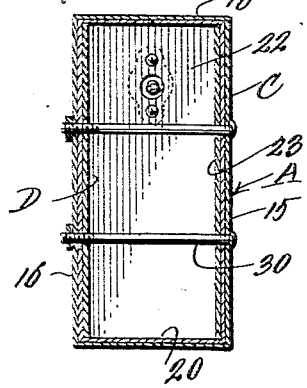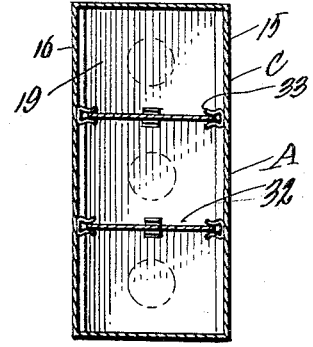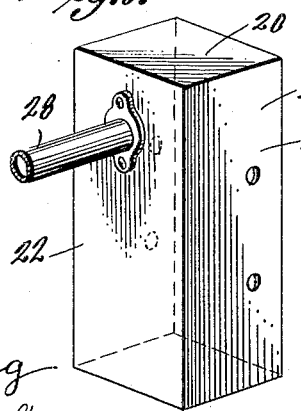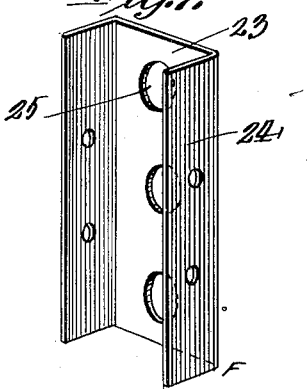

Patented Oct. 13, 1925.

1,557,335

UNITED STATES PATENT OFFICE.

FREDERICK L. ROCK AND ARTHUR J. ROCK, OF BURLINGTON, VERMONT.

AUTOMOBILE SIGNAL.

Application filed June 23, 1924. Serial No. 721,845.

*To all whom it may concern:*

Be it known that we, FREDERICK L. ROCK and ARTHUR J. ROCK, citizens of the United States, residing at Burlington, in the county of Chittenden and State of Vermont, have invented certain new and useful Improvements in Automobile Signals, of which the following is a specification.

This invention appertains to automobile appliances and the primary object of the invention is to provide a novel device carried by an automobile for indicating to traffic in front and rear thereof the intended course of the vehicle equipped with the device.

Another object of the invention is the provision of a novel signal casing having a plurality of signalling chambers therein and having the front and rear walls thereof provided with signalling indicia and a removable housing fitted in one end of the casing carrying suitable lamp sockets and lamps for fitting in the compartments, whereby the compartments can be illuminated when so desired.

A still further object of the invention is to provide novel means for mounting the casing at a convenient point on the automobile whereby the same can be easily seen from both the front and the rear of the vehicle.

A still further object of the invention is to provide a direction signal for motor vehicles of the above character which will be durable and efficient in use, one that will be simple and easy to manufacture and one which can be placed upon the market and incorporated with a vehicle at a small cost.

With these and other objects in view the invention consists in the novel construction, arrangement and formation of parts, as will be hereinafter more specifically described, claimed, and illustrated in the accompanying drawings, in which drawings, Figure 1 is a front elevation of the improved signal showing the same attached to one of the wind shield standards, Figure 2 is a vertical longitudinal section through the improved device showing the same attached to one of the wind shield standards, Figure 3 is a longitudinal horizontal section taken on the line 3—3 of Figure 2, Figure 4 is a transverse section taken on line 4—4 of Figure 2 looking in the direction of the arrow, Figure 5 is a transverse section taken on line 5—5 of Figure 2 looking in the direction of the arrows, Figure 6 is a detail perspective view of the housing for receiving the light sockets, and Figure 7 is a detail perspective view of the inner plate of the housing for supporting the said sockets.

Referring to the drawings in detail, wherein similar reference characters designate corresponding parts throughout the several views the letter A generally indicates the improved automobile direction signal and B a wind-shield of the motor vehicle with which the same can be associated. The wind-shield B is of the usual or any preferred character and embodies a supporting standard 10.

The improved direction signal A embodies a casing C, a housing D fitted within the casing for receiving and supporting the lamp sockets and the means E for permitting the convenient connection of the casing with the standard 10 of the wind shield B.

The casing C is preferably formed from sheet metal and includes flat front and rear walls 15 and 16, top and bottom walls 18 and an outer end wall 19. The inner end of the casing C is adapted to receive the housing D for supporting the lamp sockets and the like within the casing. The housing D embodies upper and lower walls 20, side wall 21, an outer end wall 22 and a removable inner end wall 23. This removable inner end wall 23 is provided with laterally extending right angular attaching flanges which are adapted to fit within the body portion of the housing in intimate contact with the inner surface of the side wall 21. This inner end wall 23 is provided with suitable openings 25 for the reception of any preferred type of lamp sockets 26 which support suitable electric lamps 27. The outer end wall 22 of the housing supports a hollow supporting arm or conduit 28 through which extends the electric wires 29 for the sockets as clearly shown in Figure 2 of the drawing. Now the housing D is held within the inner end of the casing C by the use of suitable removable retaining bolts 30 which are to extend through the flanges 24 of the inner end wall 23 and thus serve to hold the housing and end wall in place.

It is preferred to divide the portion of the casing C in advance of the housing D into any independent compartments 31 by suitable partitions 32 removably mounted within the casing. The partitions 32 are placed into the casing before the housing D is placed in position and suitable U-shaped clips 33 are carried by the front and rear walls 15 and 16 and the end wall for removably supporting the said partition.

These front and rear walls 15 and 16 of the housing are provided with suitable direction indicia 34 such as the words, "Let", "Stop" and "Right", and it can be seen that the word "Left" is arranged in alignment with the uppermost compartment formed in the casing, that the word "Stop" is arranged in alignment with the intermediate compartment and the word "Right" in alignment with the lowermost compartment. If so desired suitable glass plates may be placed in engagement with the inner surface of the front and rear walls 15 and 16 in rear of the struck-out letters as indicated by the reference character 34 and it is preferred to have these glass plates colored green or the like. Any means can be utilized for holding these green plates 34 in position.

The means E for holding the signal in position embodies the tubular supporting arm or conduit 28 and this arm or conduit is provided at its outer end with a collar or base plate 35 which is riveted or otherwise secured to the rigid end wall 22 of the housing. The inner end of the arm conduit 28 is provided with a two part clamp 36 which is adapted to embrace the wind-shield standard 10 and the parts of the clamp are firmly bound together in engagement with the arm and standard by the use of suitable bolts or the like 37.

The lighting of the lamps 27 can be controlled by a suitable switch which can be placed in any convenient point on the motor vehicle such as the steering wheel or the like.

From the foregoing description it can be seen that we have provided a novel automobile signal by which the traffic can readily determine in which direction the vehicle equipped with the signal is going to travel.

Changes as in detail may be made without departing from the spirit or scope of this invention, but

What we claim as new is:

1. An automobile direction signal comprising a casing, including front and rear walls, top and bottom walls, and an outer end wall, a housing fitted in the inner end of the casing including a rigid end wall, side walls, top and bottom walls and a removable end wall, inwardly extending flanges formed on the removable end wall engaging the side walls of the housing, removable bolts connecting the flanges to the side walls and the housing in the casing, removable partitions arranged in the casing forwardly of the housing, the front and rear walls of the casing being provided with direction indicia aligning with the compartments formed by the partitions, and sockets and incandescent bulbs carried by the inner removable wall of the housing disposed in the compartments.

2. An automobile direction indicator comprising a casing having front and rear walls provided with direction indicia, top and bottom walls, and an outer end wall, a housing fitted within the inner end of the casing terminating flush with the inner end thereof, the housing having a removable inner wall, means detachably securing the housing and its removable inner wall in place, partitions fitted within the casing engaged by the housing dividing the casing into a plurality of signalling compartments, and lamps and sockets carried by the removable inner wall of the housing arranged to project into said compartments, the housing with its removable inner wall forming means for protecting the sockets from the elements and means for permitting the quick removal of the last mentioned sockets from the casing.

In testimony whereof we affix our signatures.

FREDERICK L. ROCK.
ARTHUR J. ROCK.